United States Patent

[11] 3,575,189

| [72] | Inventor | Larry S. Smith<br>Goshen, Ind. |
|---|---|---|
| [21] | Appl. No. | 796,073 |
| [22] | Filed | Feb. 3, 1969 |
| [45] | Patented | Apr. 20, 1971 |
| [73] | Assignee | Robertshaw Controls Company<br>Richmond, Va. |

[54] PNEUMATIC CONTROL SYSTEM AND PNEUMATICALLY OPERATED REVERSING RELAY CONSTRUCTION THEREFOR OR THE LIKE
20 Claims, 6 Drawing Figs.

| [52] | U.S. Cl. | 137/85 |
|---|---|---|
| [51] | Int. Cl. | F15b 5/00,<br>G05d 16/00 |
| [50] | Field of Search | 137/85, 86,<br>82; 92/48, 49; 251/367 |

[56] References Cited
UNITED STATES PATENTS

| 1,473,173 | 11/1923 | Brinkerhoff | 92/49 |
|---|---|---|---|
| 3,086,544 | 4/1963 | Yost | 251/367X |
| 3,165,262 | 1/1965 | Ollevier | 137/85X |
| 3,326,228 | 6/1967 | Phillips | 137/86 |

*Primary Examiner*—Alan Cohan
*Attorneys*—Auzville Jackson, Jr., Robert L. Marben and Candor, Candor and Tassone ABSTRACT: This disclosure relates to a reversing pneumatic relay construction comprising a housing carrying a one-piece diaphragm member having three spaced diaphragm portions disposed in stacked relation that cooperate with the housing to define a branch pressure chamber, a pilot pressure chamber and an exhaust chamber in stacked relation with the housing having a stationary valve seat for interconnecting a main pressure chamber and the branch chamber together. The diaphragm member is adapted to open and close the valve seat and has an opening passing therethrough for interconnecting the branch chamber and the exhaust chamber together. A movable valve member for opening and closing the stationary valve seat is disposed in the main chamber and projects through the valve seat into the branch chamber for controlling the opening passing through the diaphragm member.

3,575,189

PATENTED APR 20 1971

INVENTOR
LARRY S. SMITH

BY
Cauden & Cauden

HIS ATTORNEYS

3,575,189
PATENTED APR 20 1971
SHEET 2 OF 2
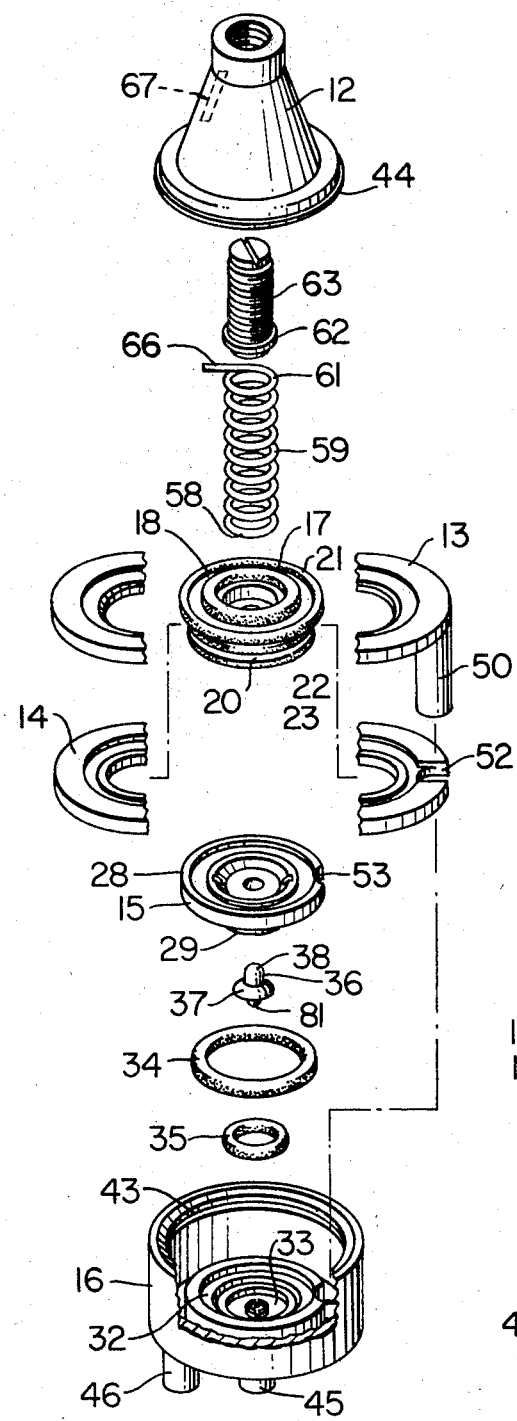
FIG. 5
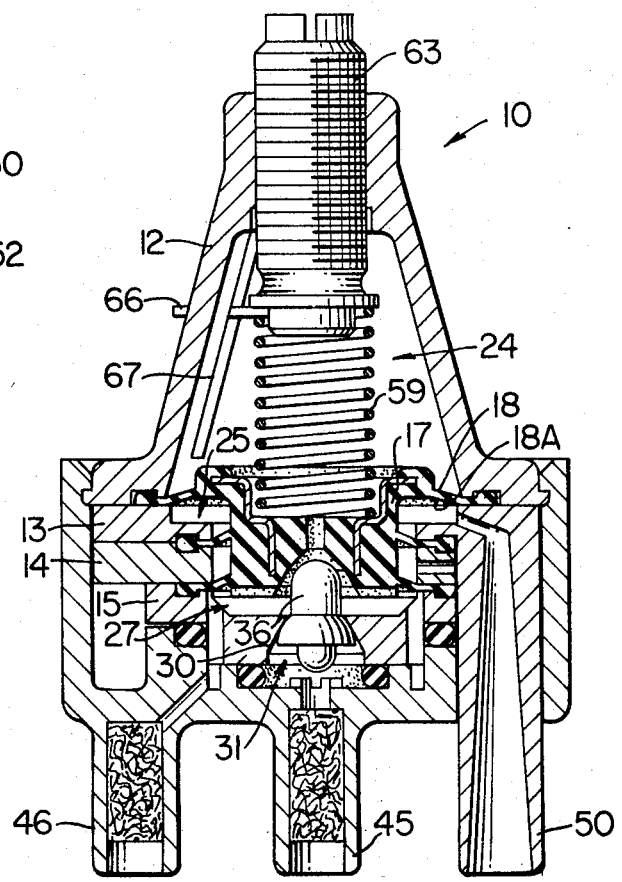
FIG. 6
FIG. 4
INVENTOR
LARRY S. SMITH
BY
Cauder & Cauder
HIS ATTORNEYS

PNEUMATIC CONTROL SYSTEM AND PNEUMATICALLY OPERATED REVERSING RELAY CONSTRUCTION THEREFOR OR THE LIKE

This invention relates to an improved pneumatic control system as well as to an improved pneumatic reversing relay for such a control system or the like.

It is well known that the reversing relays have been provided wherein a pressure source is adapted to be interconnected to a branch line leading to a control device inversely proportional to a pneumatic pressure control signal being directed to the relay which controls the opening and closing of the valve means of the relay between the main pressure chamber thereof or the exhaust chamber thereof and the branch chamber thereof.

It is a feature of this invention to provide such a pneumatic reversing relay which is less expensive to manufacture, easier to assemble and which has a performance which is equal to or superior to conventional pneumatic reversing relays.

In particular, one embodiment of this invention provides a pneumatic relay wherein no staking, riveting or other subassembly operations are required as in conventional relay constructions, all of the parts of this invention being adapted to be dropped into place and are self-aligned so that alignment problems are greatly reduced as well as the manufacturing costs thereof.

For example, the pneumatic relay of this invention comprises a housing carrying a one-piece diaphragm member having spaced diaphragm portions in stacked relation to cooperate with the housing to define a branch pressure chamber, a pilot pressure chamber and an exhaust chamber in stacked relation with the housing having a stationary valve seat for interconnecting a main chamber and the branch chamber together and being disposed outboard of the diaphragm member. A movable valve member is disposed in the main pressure chamber for controlling the valve seat and projects through the valve seat into the branch pressure chamber for controlling an opening that passes through the diaphragm member and is adapted to interconnect the branch pressure chamber with the exhaust chamber.

Accordingly, it is an object of this invention to provide an improved pneumatic control system having one or more of the novel features set forth above or hereinafter shown or described.

Another object of this invention is to provide an improved pneumatic reversing relay construction having one or more of the novel features set forth above or hereinafter shown or described.

Other objects, uses and advantages of this invention are apparent from a reading of this description which proceeds with reference to the accompanying drawings forming a part thereof and wherein:

FIG. 4 is a view similar to FIG. 2 and illustrates the relay construction in another operating position thereof.

FIG. 5 is an exploded perspective view of the various parts of the relay construction of this invention.

FIG. 6 is a schematic view illustrating the improved pneumatic control system of this invention.

Figure 1:
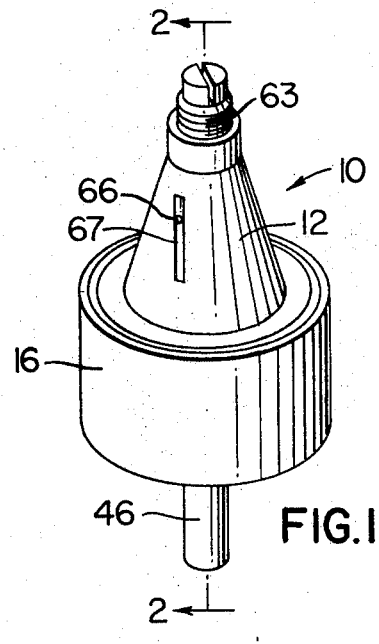
FIG. 1 is a perspective view of the improved pneumatic reversing relay construction of this invention.

While the various features of this invention are hereinafter described and illustrated as being particularly adapted to provide a pneumatic relay construction for controlling a pneumatically operated heat exchanging device, it is to be understood that the various features of this invention can be utilized singly or in any combination thereof to provide control means for other devices as desired.

Therefore, this invention is not to be limited to only the embodiment illustrated in the drawings, because the drawings are merely utilized to illustrate one of the wide variety of uses of this invention.

Figure 2:
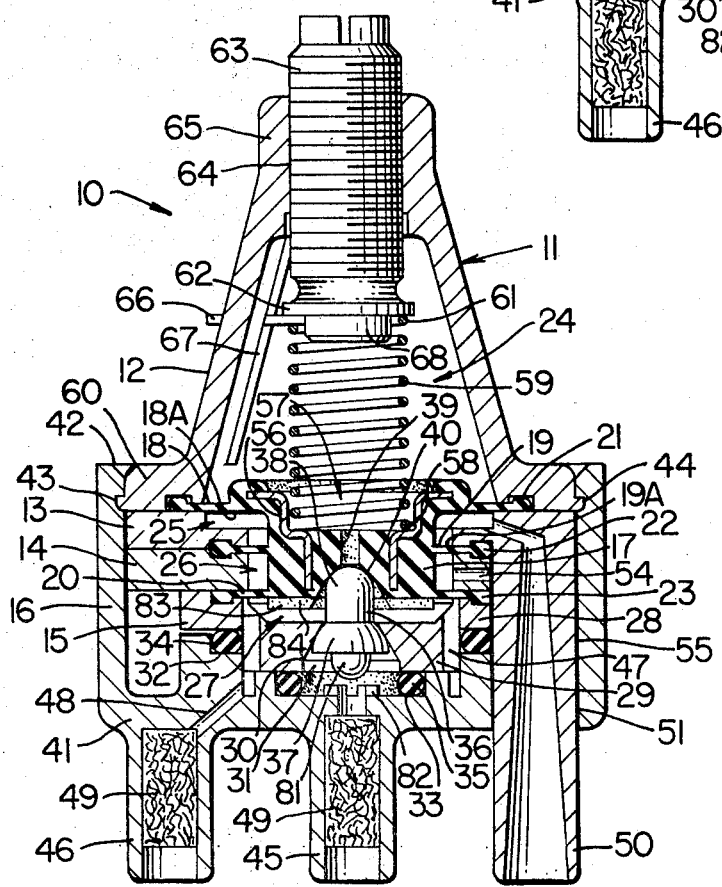
FIG. 2 is an enlarged, cross-sectional view taken on line 2–2 of FIG. 1 and illustrates the relay construction in one of the operating positions thereof.

Referring now to FIGS. 1 and 2, the improved pneumatic reversing relay construction of this invention is generally indicated by the reference numeral 10 and comprises a housing means 11 formed from a plurality of housing parts or members 12, 13, 14, 15 and 16 secured together in a manner hereinafter described and carrying a one-piece flexible diaphragm member 17 having three spaced apart diaphragm portions 18, 19 and 20 respectively provided with beaded outer peripheries 21, 22 and 23 sealingly trapped in cooperating grooves or surfaces between the housing members 12 and 13, 13 and 14, and 14 and 15 as illustrated in FIG. 2 to define with the housing means 11 an exhaust chamber 24, a pilot pressure chamber 25, an intermediate chamber 26 and a branch pressure chamber 27. The effective area of the underside 18A of the diaphragm portion 18 is greater than the upper side 19A of the diaphragm portion 19 for a purpose hereinafter described.

The housing member 15 has an upper outer portion 28 and a lower central portion 29 stepped downwardly therefrom with the central portion 29 having a substantially frustoconical valve seat 30 interconnecting the branch pressure chamber 27 to a main pressure chamber 31, the upper portion 28 and lower portion 29 of the housing member 15 being sealed to cooperating stepped portions 32 and 33 of the housing member 16 by annular O-rings 34 and 35.

A valve member 36 is disposed in the main pressure chamber 31 of the housing means 11 and has a frustoconical enlargement 37 for opening and closing the stationary valve seat 30 while an upper portion 38 thereof projects through the valve seat 30 into the branch pressure chamber 27 to open and close an opening 39 passing centrally through the diaphragm member 17 and defining a frustoconical resilient valve seat 40 at the lower end thereof whereby the opening 39 in the diaphragm member 17 is adapted to fluidly interconnect the branch pressure chamber 27 with the exhaust chamber 24.

The housing member 16 is substantially cup-shaped and is provided with a closed end wall 41 and an open end 42 receiving the housing members 15, 14, 13 and 12 therein in stacked relation, the housing member 16 being provided with an annular groove 43 adjacent the open end 42 thereof which snap fittingly receives an outwardly directed annular tongue 44 on the housing member 12 to hold and secure the parts 16, 35, 34, 15, 17, 14, 13 and 12 together in stacked relation with the valve member 36 being movable relative thereto for a purpose hereinafter described. The closed end wall 41 of the housing member 16 is provided with a pair of outwardly directed, integral nipple extensions 45 and 46 respectively adapted to fluidly interconnect the exterior of the device 10 to the main pressure chamber 31 and to the branch pressure chamber 27, the nipple extension 46 being interconnected to the branch pressure chamber 27 by suitable openings 47 passing through the housing member 15 and being disposed in fluid communication with an angled passage means 48 in the end wall 41 of the housing member 16.

If desired, suitable porous filtering material 49 can be disposed in the nipple extensions 45 and 46 as illustrated.

The housing member 13 has an integral conduit or nipple extension 50 extending downwardly therefrom and passing loosely through an opening 51 in the closed end wall 41 of the housing member 16 in the assembly illustrated in FIG. 2, the housing members 14 and 15 respectively having cooperating and aligned cutouts 52 and 53 in the outer peripheries thereof for permitting the telescoped relation with the nipple extension 50 of the housing member 13 as illustrated in FIGS. 2 and 5. The nipple extension 50 of the housing member 13 is adapted to fluidly interconnect the exterior of the device 10 to the pilot pressure chamber 25 as illustrated.

Figure 3:
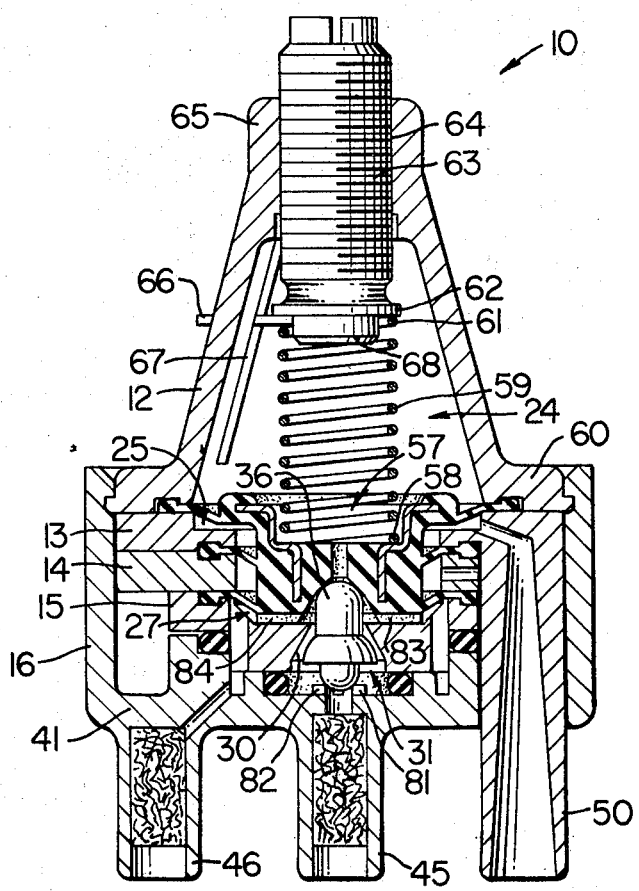
FIG. 3 is a view similar to FIG. 2 and illustrates the relay construction in another operating position thereof.

The intermediate chamber 26 defined between the diaphragm portions 19 and 20 of the diaphragm member 17 is fluidly interconnected by a radially disposed passage 54 in the housing member 14 to a leakage passage means 55 disposed about the nipple extension 50 of the housing member 13 so that the intermediate chamber 26 is always interconnected to the atmosphere and a retarding dashpot effect of the intermediate chamber 26 cannot take place during the movement of the diaphragm member 17 between the positions illustrated respectively in FIGS. 2—4 for a purpose hereinafter described.

If desired, a metallic reinforcing member 56 can be molded with the diaphragm member 17 in the manner illustrated in FIG. 2 so as to cooperate therewith and define an opening 57 in the upper end of the diaphragm member 17 to receive one end 58 of a compression spring 59 disposed in the open end 60 of the cup-shaped housing member 12, the other end 61 of the compression spring 59 bearing against a disclike portion 62 of a threaded adjusting member 63 threadedly disposed in a threaded bore 64 in the upper end 65 of the housing member 12. The upper end 61 of the compression spring 59 can have a part 66 thereof projecting outwardly through an elongated slot 67 formed through the housing member 12 so as to maintain alignment of the compression spring 59 relative to the housing member 12 and diaphragm member 17 during the adjustment thereof by the adjusting member 63, the adjusting member 63 having a lower extension 68 projecting into the compression spring 59 as illustrated in FIG. 2 to also maintain such alignment.

Therefore, it can be seen that the various parts of the pneumatic reversing relay construction 10 of this invention can be formed in a simple and economical manner, such as being from molded plastic or the like, and can be assembled together by merely serially dropping the various parts thereof into place into the open end 42 of the housing member 16 with the same subsequently being secured together by the snap-fit relation between the cup-shaped housing members 16 and 12 so that no riveting, staking or other subassembly operations are required to form the pneumatic reversing relay construction 10 of this invention.

The pneumatic reversing relay construction 10 of this invention as previously described can readily be utilized in the improved pneumatic control system of this invention which is generally indicated by the reference numeral 69 in FIG. 6 and will now be described.

As illustrated in FIG. 6, the pneumatic reversing relay construction 10 of this invention is adapted to have the nipple extension 45 thereof fluidly interconnected to a conduit means 70 which leads from a pressure regulator 71 that is supplied with a pressure source by a conduit means 72 whereby the pressure regulator 71 will always direct pneumatic pressure at the pressure setting of the regulator 71 through the conduit and nipple extension 45 to the main pressure chamber 31 of the relay 10.

The pressure regulator 71 is also adapted to direct the main pressure source at the regulated pressure through a conduit means 73 to a pneumatic comparator 74 that is adapted to direct a pneumatic pressure signal through a conduit 75 to the nipple extension 50 of the pneumatic relay 10 of this invention whereby the pneumatic signal from the comparator 74 is fluidly interconnected to the pilot pressure chamber 25 of the relay 10.

The pressure regulator 71 also directs the regulator pressure through a conduit means 76 to a temperature sensor 77 which, in turn, directs a pneumatic signal through a conduit means 78 to the other side of the comparator 74 in relation to the temperature effect being sensed by the device 77 and in relation to a particular temperature effect setting thereof.

A reverse acting pneumatically operated heat exchanging device 79 is provided in the system 69 of FIG. 6 and is fluidly interconnected by a conduit 80 leading to the nipple extension 46 of the pneumatic relay 10 of this invention so as to always be in fluid communication with the branch pressure chamber 27 of the pneumatic relay 10, the pneumatically operated heat exchanger construction 79 being reverse acting in that as the branch pressure being directed thereto by the pneumatic relay 10 from the branch pressure chamber 27 decreases in pressure, the pneumatically operated heat exchanger 79 increases its temperature output effect accordingly. Conversely, as the branch pressure being directed to the pneumatically operated heat exchanger device 79 increases, the temperature output effect of the heat exchanger means 79 decreases as will be apparent hereinafter.

The operation of the pneumatic reversing relay construction 10 of this invention as utilized in the system 69 of FIG. 6 will now be described.

Assuming that the condition responsive means 77 has been set for a desired output temperature effect that the pneumatically operated heat exchanger means 79 is to maintain, such as 70° F., and that the pneumatically operated heat exchanger means 79 is maintaining such output temperature effect, the pneumatic signal being directed by the comparator 74 through the conduit means 75 to the pilot pressure chamber 25 of the pneumatic reversing relay 10 and tending to cause upward movement of the diaphragm member 17 because of the larger effective area of the surface 18A over the effective area of the surface 19A in combination with the pressure in the branch pressure chamber 27 that is also tending to move the diaphragm member upwardly is so balanced by the opposing force of the range spring 59 that is tending to move the diaphragm member 17 downwardly that the diaphragm member 17 is disposed in the position illustrated in FIG. 2 so that the pneumatic pressure in the main pressure chamber 31 maintains the valve member 37 closed against the stationary valve seat 30 to prevent fluid communication between the main pressure chamber 31 and the branch pressure chamber 27. In addition, the upper end 38 of the valve member 36 is being engaged by the resilient valve seat 40 of the diaphragm member 17 so that fluid communication between the branch pressure chamber 27 and the exhaust chamber 24 is prevented by the valve member 36 whereby the pressure being directed from the branch pressure chamber 27 to the pneumatically operated heat exchanger means 79 is at a level that maintains the output temperature effect of the heat exchanger means 79 at the output temperature effect setting of the condition responsive means 77.

However, should the output temperature effect of the heat exchanger means 79 increase above the output temperature effect setting of the condition responsive means 77 a certain amount, then the comparator 74 decreases the pressure of the pneumatic signal directed thereby through the conduit 75 to the pilot pressure chamber 25 in the manner illustrated in FIG. 3 whereby the branch pressure in the branch chamber 27 is now overcome by the force of the compression spring 59 and the diaphragm member 17 is moved downwardly as illustrated in FIG. 3 to carry the valve member 36 therewith to open the stationary valve seat 30 and interconnect the main pressure chamber 31 with the branch pressure chamber 27. It can be seen that the lower end 81 of the valve member 36 is adapted to bottom out against upwardly directed and circumferentially spaced abutments 82 on the lower end wall 41 of the housing member 16 so as to prevent the closing of the passage in the nipple extension 45 from the main pressure chamber 31. Likewise, a projection 83 extends downwardly from the diaphragm member 17 and is provided with a plurality of radially disposed slots 84 so as to permit fluid communication between the stationary valve seat 30 and the branch pressure chamber 27 should the diaphragm member 17 also bottom out against the housing member 15 in the position illustrated in FIG. 3 during the operation of the pneumatically reversing relay 10.

In this manner, with the relay construction 10 now disposed in the position illustrated in FIG. 3, pressure is directed from the main pressure chamber 31 through the opened valve seat 30 into the branch pressure chamber 27 and, thus, is directed to the pneumatically operated heat exchanger means 79 whereby the increased branch pressure to the heat exchanger means 79 causes the same to decrease its output temperature effect.

Therefore, the pneumatic fluid construction 10 remains in the position illustrated in FIG. 3 until the condition responsive means 77 now senses the temperature output effect of the heat exchanger means 79 has decreased back to the output temperature effect setting of the condition responsive means 77 so that the comparator 74 increases the pneumatic signal being directed to the pilot chamber 25 whereby the pneumatic relay construction is returned back to the position illustrated in FIG. 2.

Conversely, should the output temperature effect of the pneumatically operated heat exchanger 79 fall below the output temperature effect setting of the condition responsive means 77 a certain amount, the comparator 74 increases the value of the pneumatic signal being directed thereby to the pilot pressure chamber 25 so that the increased pressure in the pilot chamber 25 acting on the larger effective surface 18A of the diaphragm portion 18 in combination with the pressure in the branch pressure chamber 27 can force the diaphragm member 17 upwardly in opposition to the force of the compression spring 59 in the manner illustrated in FIG. 4 to move the diaphragm member 17 away from the valve member 36 so that the branch pressure chamber 27 is now fluidly interconnected to the exhaust chamber 24 and, thus, to the atmosphere through the slot 67 in the housing member 12. Since the pressure in the main pressure chamber 31 still maintains the valve member 36 in its closed position against the stationary valve seat 30, the pressure in the branch pressure chamber 27 is now reduced as the same is fluidly interconnected to the atmosphere through the exhaust chamber 24 whereby the branch pressure being directed to the pneumatically operated heat exchanger device 79 through the conduit 80 is decreased. In this manner, the reverse acting pneumatically operated heat exchanger means 79 now increases substantially proportionally its output temperature effect. The pneumatic relay construction 10 remains in the position illustrated in FIG. 4 until the condition responsive means 77 senses that the output temperature effect of the heat exchanger means 79 has now been increased to the output temperature effect setting of the condition responsive means 77 whereby the comparator 74 will then decrease the pneumatic signal directed thereby to the pilot pressure chamber 25 to return the pneumatic relay construction 10 back to the position illustrated in FIG. 2.

Therefore, it can be seen that the improved pneumatic relay construction 10 of this invention operates in an efficient manner to tend to control the pneumatic system 69 of FIG. 6 in a manner to maintain the output temperature effect of the pneumatically operated reverse acting heat exchanger means 79 at the temperature effect setting of the condition responsive means 77 in the above manner.

If it is desired that the pneumatic relay construction 10 of this invention is to have an advanced or retarded output effect on the pneumatically operated device 79, the adjusting member 63 can be turned counterclockwise or clockwise respectively to change the force exerted by the range spring 59, as desired.

Therefore, it can be seen that not only does this invention provide an improved pneumatic control system, but also this invention provides an improved pneumatically operated reverse acting relay construction.

I claim:

1. A pneumatic control device comprising a housing means carrying a one-piece diaphragm member having an axial body portion provided with opposed ends and provided with axially spaced diaphragm portions that cooperate with said housing means to define first, second and third chambers in stacked relation with said first and third chambers respectively being outboard of said ends of said body portion, said diaphragm member having opening means passing through said body portion at said ends thereof and defining a resilient valve seat at one of said ends of said body portion for interconnecting said first and third chambers together and defining a spring receiving recess at the other end of said body portion, said housing means having a stationary valve seat being adapted to interconnect said fourth chamber and said third chamber together, and a valve member disposed in said fourth chamber for opening and closing said stationary valve seat and projecting through said stationary valve seat into said third chamber to control and be engageable by said resilient valve seat of said diaphragm member.

2. A pneumatic control device as set forth in claim 1 wherein said diaphragm portions of said diaphragm member define an intermediate chamber with said housing means between said second and third chambers, said housing means having means for fluidly interconnecting said intermediate chamber to the atmosphere to eliminate a dashpot effect of said intermediate chamber upon movement of said diaphragm member.

3. A pneumatic control device as set forth in claim 2 wherein said diaphragm member has three axially spaced diaphragm portions.

4. A pneumatic control device as set forth in claim 1 wherein said housing means carries spring means engaging said diaphragm member to tend to move said diaphragm member in a direction to cause said diaphragm member to open said valve member away from said stationary valve seat.

5. A pneumatic control device as set forth in claim 4 wherein said housing means carries adjusting means for adjusting the biasing force of said spring means acting on said diaphragm member.

6. A pneumatic control device as set forth in claim 1 wherein said housing means is formed from a plurality of housing members disposed in stacked relation, the two outboard housing members having means snap-fitted together to secure said housing members and said diaphragm member together.

7. A pneumatic control device as set forth in claim 6 wherein said two outboard housing members are cup-shaped and respectively have their open ends snap-fitted together.

8. A pneumatic control device as set forth in claim 7 wherein one of said cup-shaped housing members has its open end telescoped within the open end of the other cup-shaped housing member.

9. A pneumatic control device as set forth in claim 1 wherein a spring means is carried by said housing means and has one end received in said recess to tend to move said diaphragm member in a direction to cause said diaphragm member to move said valve member away from said stationary valve seat.

10. A pneumatic control device as set forth in claim 9 wherein said diaphragm member carries a reinforcing member that lines said spring receiving recess thereof and internally reinforces said body portion.

11. In a pneumatic control system having a pneumatic source, a pneumatically operated device to be controlled, and signal means for directing a pilot pneumatic signal in relation to a desired output of said device, the improvement comprising a pneumatic reversing relay comprising a housing means carrying a one-piece diaphragm member having an axial body portion provided with opposed ends and provided with axially spaced diaphragm portions that cooperate with said housing means to define an exhaust chamber, a pilot chamber and a branch pressure chamber in stacked relation with said exhaust and branch chambers respectively being outboard of said ends of said body portion, said diaphragm member having opening means passing through said body portion at said ends thereof and defining a resilient valve seat at one of said ends of said body portion for interconnecting said exhaust and branch chambers together and defining a spring receiving recess at the other end of said body portion, said housing means having a stationary valve seat and a main pressure chamber with said stationary valve seat being adapted to interconnect said main chamber and said branch chamber together, means fluidly interconnecting said main chamber to said pneumatic source, means fluidly interconnecting said branch pressure chamber to pneumatically operated device, means fluidly interconnecting said pilot pressure chamber to said signal means, means fluidly interconnecting said exhaust chamber to the atmosphere, and a valve member disposed in said main chamber for opening and closing said stationary valve seat and projecting through said stationary valve seat into said branch chamber to control and be engageable by said resilient valve seat of said diaphragm member.

12. In a pneumatic control system as set forth in claim 11, the further improvement wherein said diaphragm portions of said diaphragm member define an intermediate chamber with said housing means between said pilot and branch chambers, said housing means having means for fluidly interconnecting said intermediate chamber to the atmosphere to eliminate a dashpot effect of said intermediate chamber upon movement of said diaphragm member.

13. In a pneumatic control system as set forth in claim 2, the further improvement wherein said diaphragm member has three axially spaced diaphragm portions.

14. In a pneumatic control system as set forth in claim 11, the further improvement wherein said housing means carries spring means engaging said diaphragm member to tend to move said diaphragm member in a direction to cause said diaphragm member to open said valve member away from said stationary valve seat.

15. In a pneumatic control system as set forth in claim 14, the further improvement wherein said housing means carries adjusting means for adjusting the biasing force of said spring means acting on said diaphragm member.

16. In a pneumatic control device as set forth in claim 11, the further improvement wherein said housing means is formed from a plurality of housing members disposed in stacked relation, the two outboard housing members having means snap-fitted together to secure said housing members and said diaphragm member together.

17. In a pneumatic control system as set forth in claim 16, the further improvement wherein said two outboard housing members are cup-shaped and respectively have their open ends snap-fitted together.

18. In a pneumatic control system as set forth in claim 17, the further improvement wherein one of said cup-shaped housing members has its open end telescoped within the open end of the other cup-shaped housing member.

19. In a pneumatic control system as set forth in claim 11, the further improvement wherein a spring means is carried by said housing means and has one end received in said recess to tend to move said diaphragm member in a direction to cause said diaphragm member to move said valve member away from said stationary valve seat.

20. In a pneumatic control system as set forth in claim 19, the further improvement wherein said diaphragm member carries a reinforcing member that lines said spring receiving recess thereof and internally reinforces said body portion.